US011459753B2

(12) United States Patent
McGee et al.

(10) Patent No.: US 11,459,753 B2
(45) Date of Patent: Oct. 4, 2022

(54) MODULAR CEILING SYSTEM

(71) Applicant: PORTA-FAB CORPORATION, Chesterfield, MO (US)

(72) Inventors: Wayne McGee, Chesterfield, MO (US); Steve Skikas, St. Charles, MO (US); Trace Woodrum, Ballwin, MO (US); Thomas Tall, Beaufort, MO (US)

(73) Assignee: PORTA-FAB CORPORATION, Chesterfield, MO (US)

( * ) Notice: Subject to any disclaimer, the term of this patent is extended or adjusted under 35 U.S.C. 154(b) by 66 days.

(21) Appl. No.: 17/008,036

(22) Filed: Aug. 31, 2020

(65) Prior Publication Data
US 2022/0064949 A1 Mar. 3, 2022

(51) Int. Cl.
| | |
|---|---|
| *E04B 9/06* | (2006.01) |
| *E04H 9/02* | (2006.01) |
| *E04B 9/22* | (2006.01) |
| *F16L 5/00* | (2006.01) |
| *E04H 5/02* | (2006.01) |
| *E04B 9/00* | (2006.01) |
| *E04H 5/08* | (2006.01) |
| *E04B 9/04* | (2006.01) |
| *F16L 3/22* | (2006.01) |
| *E04H 5/00* | (2006.01) |

(52) U.S. Cl.
CPC ............ *E04B 9/064* (2013.01); *E04B 9/006* (2013.01); *E04B 9/04* (2013.01); *E04B 9/225* (2013.01); *E04H 5/02* (2013.01); *E04H 5/08* (2013.01); *E04H 9/021* (2013.01); *F16L 3/22* (2013.01); *F16L 5/00* (2013.01); *E04H 2005/005* (2013.01)

(58) Field of Classification Search
CPC .......... E04B 9/006; E04B 9/04; E04B 9/0421; E04B 9/0428; E04B 9/06; E04B 9/064; E04B 9/065; E04B 9/067; E04B 9/068; E04B 9/12; E04B 9/127; E04B 9/14; E04B 9/18; E04B 9/183
See application file for complete search history.

(56) References Cited

U.S. PATENT DOCUMENTS

| | | | | |
|---|---|---|---|---|
| 4,010,591 A | * | 3/1977 | Gross ...................... | E04B 9/064 52/846 |
| 4,494,350 A | * | 1/1985 | Sharp ...................... | E04B 9/122 403/347 |
| 4,901,485 A | * | 2/1990 | Menchetti ............. | E04B 9/0428 181/291 |
| 4,944,129 A | * | 7/1990 | Hartleif ................... | E04B 9/183 52/506.08 |

(Continued)

*Primary Examiner* — Kyle J. Walraed-Sullivan
(74) *Attorney, Agent, or Firm* — Lewis Rice LLC (57) ABSTRACT

A structural grid support system adapted for transferring seismic loads to the vertical structural supports of a modular structure. The system includes larger and longer high load capacity main runners with mechanically fastened cross tees, which transfer seismic forces without failing. The structural grid can provide a diaphragm using mechanically fastened connections in a single horizontal plane without requiring additional overhead support from the roof deck, or requiring fewer such supports. The main runners may include additional connecting elements disposed within the usable space beneath the runner (e.g., ventral threaded receivers) for attaching deployment-specific equipment or hardware, such as network cable trays.

19 Claims, 7 Drawing Sheets

(56) References Cited

U.S. PATENT DOCUMENTS

| | | | | |
|---|---|---|---|---|
| 5,033,247 | A | * | 7/1991 | Clunn ...................... E04B 9/242 |
| | | | | 52/506.08 |
| 5,154,031 | A | * | 10/1992 | Wall .......................... E04B 9/10 |
| | | | | 403/346 |
| 5,313,759 | A | * | 5/1994 | Chase, III ................. E04B 9/02 |
| | | | | 52/39 |
| 5,469,681 | A | * | 11/1995 | Wu .......................... E04B 9/064 |
| | | | | 403/174 |
| D392,054 | S | * | 3/1998 | McGee ........................ D25/125 |
| 6,158,186 | A | * | 12/2000 | Feller ........................ E04B 9/02 |
| | | | | 52/506.05 |
| 7,260,919 | B1 | * | 8/2007 | Spransy .................. E04B 9/183 |
| | | | | 52/585.1 |
| 2008/0216431 | A1 | * | 9/2008 | McGee ................... E04B 9/225 |
| | | | | 52/506.09 |
| 2011/0167747 | A1 | * | 7/2011 | Huang .................. E04B 9/0428 |
| | | | | 52/506.08 |
| 2013/0308303 | A1 | * | 11/2013 | Greenholt ............. F21V 33/006 |
| | | | | 362/150 |

* cited by examiner

MODULAR CEILING SYSTEM

BACKGROUND OF THE INVENTION

Field of the Invention

This disclosure is related to the field of modular structures. In particular, it relates to a modular ceiling support.

Description of the Related Art

The adoption rate of modular offices and in-plant buildings continues to rise in a variety of industries, ranging from industrial, cleanroom to office settings. Modular structures are generally constructed from vertical modular panels, which serve as walls. These panels may be attached to existing floors and ceilings to form an in-plant structure, or otherwise secured to a solid surface, such as pavement. Generally, the structures are assembled by chalking out the floor plan for the structure and locating the walls. Next, a floor track is cut to plan and installed by securing it to the substrate (e.g., pavement, building floor, etc.) with a series of anchors.

Ceilings presents a unique challenge because, by their nature, they are positioned above the occupants and thus must be sufficiently secure to pose little risk of collapse and injury. Generally, prior art ceiling systems are two parts, the first consisting of a membrane or dust cover installed by fixing a series of panels or steel deck sections to molding installed at the tops of the structural studs and panels. The second part consists of an acoustic ceiling positioned below the cover. This is usually done by installing an angled wall mold (e.g., an L-shaped retaining element) on the interior wall, and hanging a series of metal beams, called main runners, from the ceiling. Each main runner rests on wall molds at opposing ends. The main runner generally has an inverted T-shaped cross-section and is supported from the dust cover by a hanger strap and/or wire, and supported at its opposing ends by the wall molds. Next, a plurality of cross-Ts are installed at right angles to the main runners. The cross-T's act as shorter beams configured to interface with the main runners at regular intervals to form an orthogonal metal ceiling grid with a number of rectangular or square openings. Finally, lighting, HVAC, and other equipment is installed in the grid. The remaining openings are filled with ceiling panels, which rest on the flanges of the main runners and cross-Ts.

For a small installation with short spans, or installations where the ceiling system will not need to support the weight of heavy equipment, this structure alone may be sufficient. However, in installations involving long spans or heavy equipment installed in a ceiling system, it may be necessary to provide additional load support by connecting the ceiling grid to the overhead structural roof of the building in which the modular office or in-plant building is installed. This may be done by connecting a series of metal supports between the runners and the overhead structural elements of the building roof, such as structural support beams.

Although such modular buildings are generally either installed in-plant or are small outdoor facilities, they often still must comply with various building codes. For example, the structure must be able to withstand various forces that may act on it, which in practical terms means transmitting the forces received by the structure to the foundation and ultimately into the earth, which can absorb and disperse the force. For example, consider a simple A-frame building accumulating the weight of snow on the shingles. The weight of the snow is transmitted through the shingles to the studs of the A-frame, which are in turn anchored to the tops of vertical structural supports in the outer walls of the building. Thus, the weight of the snow is ultimately transmitted to the Earth through a "load path" through the building.

The simplest load every structure must be able to handle is a vertical load imparted by gravity, also known as a gravity load. The gravity load is the downward forces imparted to the structure by the mass of its own components and components situated above it (e.g., in a mezzanine installation).

Most building codes also require that structures be able to withstand some amount of lateral load, meaning forces applied at a vector not generally parallel to that of gravity (e.g., to the sides). Sources of these loads include wind forces and impacts by persons or objects. In structural engineering, a structure known as a diaphragm assists with transmitting lateral loads to the vertical resisting elements, which then transmit the loads to the foundation. The diaphragm is typically a horizontal system and may be flexible or rigid. The diaphragm in turn has other elements, one of which is a membrane—effectively a planar element to transmit in-plane shear. Sophisticated diaphragms can also resist vertical loads well beyond the self-weight of the structure, providing a floor, ceiling, walkable deck, and so forth. By spacing the vertical structural studs appropriately, gravity and lateral loads in a modular structure can generally be accommodated by the structural studs and wall elements.

In many applications, earthquake loading must also be considered, with the magnitude of force varying from location to location depending on the degree of seismic activity likely to occur. Although seismic loads are a of lateral load, the nature of a seismic load can differ significantly from common lateral loads such as wind shear, and different elements of the structure may be more significantly impacted by seismic loads than lateral loads.

In particular, in modular-structures utilizing a drop ceiling or acoustical ceiling, it is desirable to store heavy equipment between the ceiling and diaphragm, and also to make the ceiling "walkable" for repairs and maintenance access. As previously described, such ceilings may require support from the overhead structural roof, such as by suspending the grid structure using tensioning rods and turnbuckles. Although this type of installation can handle vertical loads and deflection, it becomes problematic in the context of seismic loads because the rapid shaking motion may compromise the load path and/or dislodge equipment and paneling. This creates increased risk of ceiling failure, failing panels or equipment, and presents a safety threat to persons beneath the diaphragm. This in turn presents design challenges in seismically active geographic regions for modular structures such as clean rooms and grow rooms, where it is desirable to store potentially heavy equipment in the ceiling, and where a walkable ceiling deck is convenient for maintenance and repairs.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a main runner for use in a ceiling grid for a fabricated structure comprising: a first end and an opposing second end, with an elongated body extending therebetween, the body having a cross-section comprising: a hanger element generally in the configuration of a U-shape and having an open top end adapted to accept hardware for suspending the main runner from an overhead structure; a main body element extending generally perpendicularly downward from a base of the U-shaped hanger; and a generally orthogonal S-shaped connecting element comprising: a top element, a middle element, and a bottom element; a first side element extending between the top element and the middle element at a first side to form a first cavity; and a second side element extending between the middle element and the bottom element at a second side opposite the first side to form a second cavity; wherein the top element, the middle element, and the bottom element are generally parallel; wherein the first side and the second side are generally parallel; and wherein the top element, the middle element, and the bottom element are each generally perpendicular to each of the first side and the second side.

In an embodiment of the main runner, the top element comprises a first pair of receiving channels disposed in opposing sides thereof.

In a further embodiment of the main runner, the first pair of receiving channels are threaded.

In a further embodiment of the main runner, the middle element comprises a second pair of receiving channels disposed in opposing sides thereof.

In a further embodiment of the main runner, the second pair of receiving channels are threaded.

In a further embodiment of the main runner, the bottom element comprises a pair of opposing flanges extending laterally therefrom.

In a further embodiment of the main runner, the pair of opposing flanges are sized and shaped to accept a ceiling panel on a top side thereof.

In a further embodiment of the main runner, the first cavity is sized and shaped to receive a plurality of cabling.

In a further embodiment of the main runner, the second cavity is sized and shaped to receive a second plurality of cabling.

In a further embodiment of the main runner, the bottom element comprises a receiver disposed in a bottom side thereof.

In a further embodiment of the main runner, the base element receiver is threaded.

Also described herein, among other things, is a modular ceiling grid system comprising: a plurality of main runners, each main runner in the plurality having a first end and an opposing second end, with an elongated body extending therebetween, the body having a cross-section comprising: a hanger element generally in the configuration of a U-shape and having an open top end adapted to accept hardware for suspending the beam from an overhead structure; a main body element extending generally perpendicularly downward from a base of the U-shaped hanger; a generally orthogonal S-shaped connecting element comprising: a top element, a middle element, and a bottom element; a first side element extending between the top element and the middle element at a first side to form a first cavity; and a second side element extending between the middle element and the bottom element at a second side opposite the first side to form a second cavity; wherein the top element, the middle element, and the bottom element are generally parallel; wherein the first side and the second side are generally parallel; and wherein the top element, the middle element, and the bottom element are each generally perpendicular to each of the first side and the second side; and a plurality of cross-Ts affixed to the plurality of main runners to form a generally orthogonal ceiling grid system.

In an embodiment of the modular ceiling grid system, the plurality of main runners are connected at the first end and the second end to opposing walls of a prefabricated structure.

In a further embodiment of the modular ceiling grid system, the prefabricated structure is selected from the group consisting of: an in-plant office; a data center; a clean room; a medical examination, testing, diagnostic, laboratory, or treatment room; a quarantine or isolation room; and a botanical grow room.

In a further embodiment of the modular ceiling grid system, the plurality of main runners are suspended from an overhead structure by connecting the hangers to the overhead structure.

In a further embodiment of the modular ceiling grid system, the plurality of cross-Ts are affixed to the plurality of main runners by a bracket.

In a further embodiment of the modular ceiling grid system, the system further comprises electrical, computer, or HVAC equipment installed on the modular ceiling grid system.

In a further embodiment of the modular ceiling grid system, the system further comprises walkable decking installed on the modular ceiling grid system.

Also described herein, among other things, is a method for installing a ceiling over a prefabricated or in-plant structure comprising: providing a plurality of main runners, each main runner in the plurality having a first end and an opposing second end, with an elongated body extending therebetween, the body having a cross-section comprising: a hanger element generally in the configuration of a U-shape and having an open top end adapted to accept hardware for suspending the beam from an overhead structure; a main body element extending generally perpendicularly downward from a base of the U-shaped hanger; a generally orthogonal S-shaped connecting element comprising: a top element, a middle element, and a bottom element; a first side element extending between the top element and the middle element at a first side to form a first cavity; and a second side element extending between the middle element and the bottom element at a second side opposite the first side to form a second cavity; wherein the top element, the middle element, and the bottom element are generally parallel; wherein the first side and the second side are generally parallel; and wherein the top element, the middle element, and the bottom element are each generally perpendicular to each of the first side and the second side; providing a plurality of cross-Ts; and affixing the plurality of cross-Ts to the plurality of main runners to form a generally orthogonal ceiling grid system over a prefabricated structure.

In an embodiment of the method, the prefabricated structure is selected from the group consisting of: an in-plant office; a data center; a clean room; a medical examination, testing, diagnostic, laboratory, or treatment room; a quarantine or isolation room; and a botanical grow room.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Described herein, among other things, is a structural grid support system adapted for transferring seismic loads to the vertical structural supports of a modular structure. Among other things, the system includes larger and longer high load capacity main runners with mechanically fastened cross tees better able to transfer seismic forces without failing. The structural grid can provide a diaphragm using mechanically fastened connections without requiring additional overhead support from the roof deck, or requiring fewer such supports. The grid structure is sufficiently stable to meet even aggressive seismic codes and thus can accept the installation of heavy mechanical equipment, such as ducting, fans, filters, lighting, and human-walkable decking.

Figure 1:
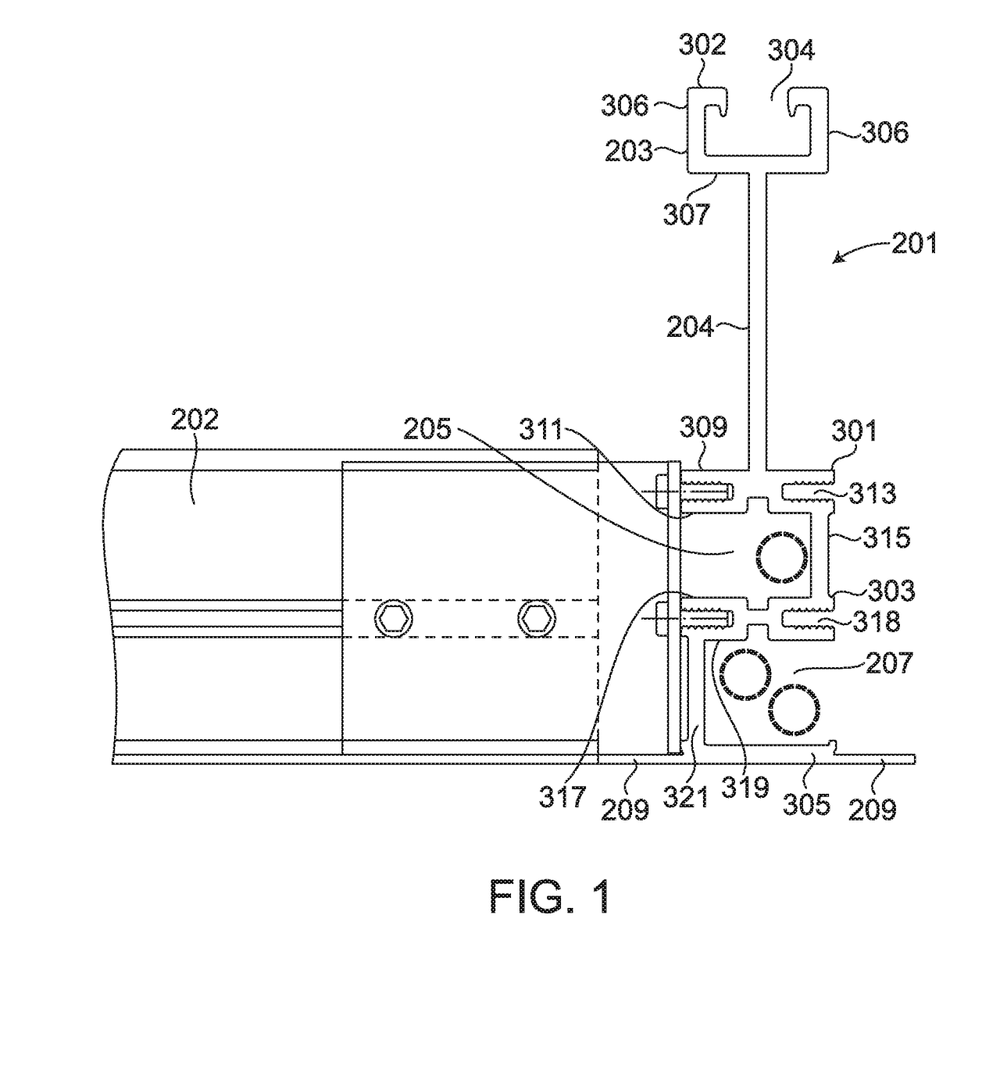
FIG. 1 is a cross-sectional view of an embodiment of a main runner having a cross-T attached thereto, as described herein.
Figure 2:
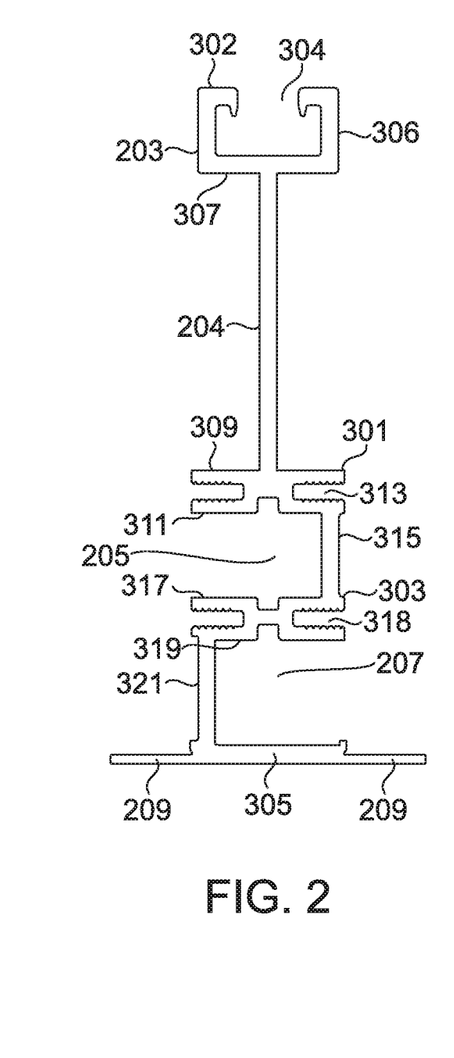
FIG. 2 is the main runner cross section of FIG. 1 without an attached cross-T.
Figure 3:
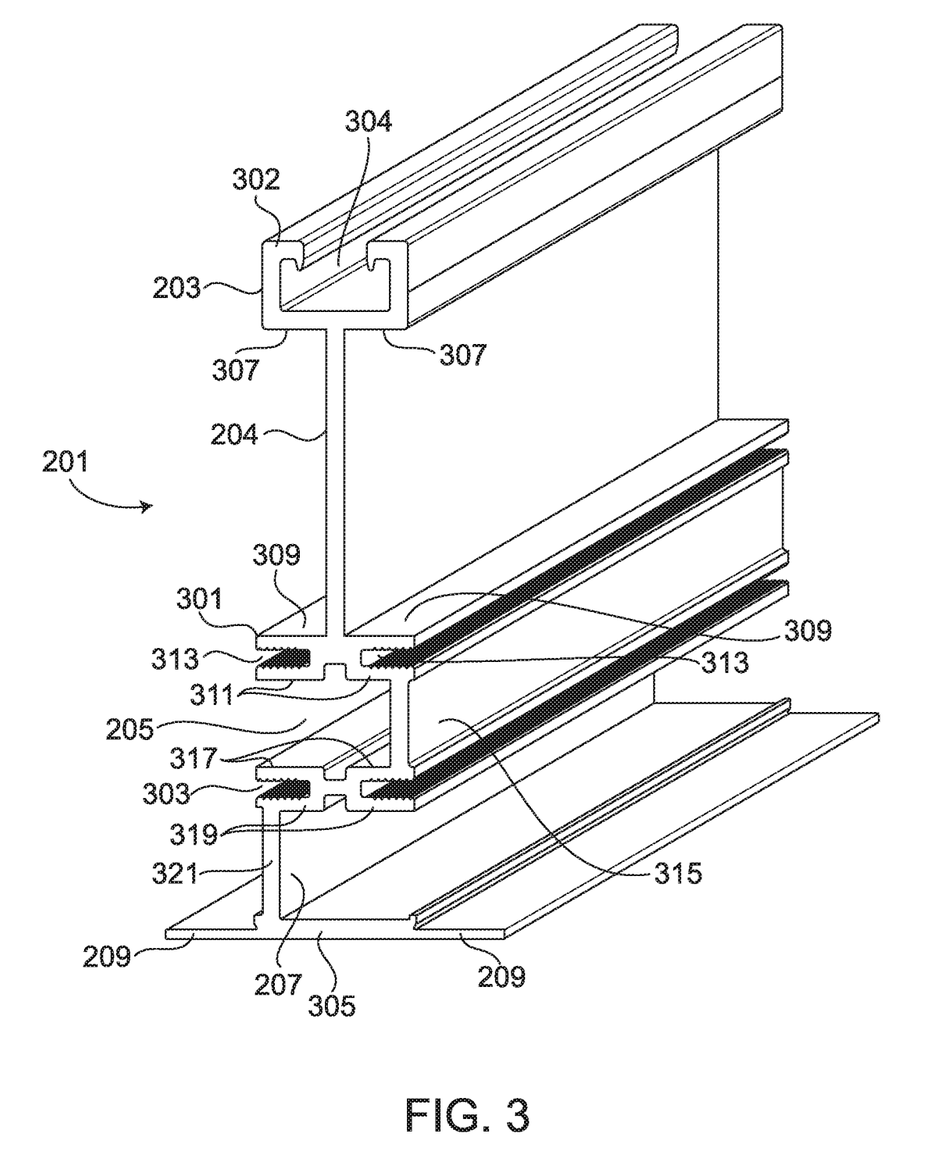
FIG. 3 is a projection of the main runner of FIGS. 1 and 2.

The following description is made with reference primarily to FIGS. 1, 2 and 3, which depict an embodiment of a main runner (201). The depicted main runner (201) comprises several component elements or systems. These include a hangar element (203) and a first channel (205) or cavity (205) with a main body element (204) extending vertically there between, and a second channel (207) or cavity (207) disposed beneath the first cavity (205). FIG. 1 depicts a cross-section of a main runner (201) according to the present disclosure with a cross-T (202) attached. FIG. 2 depicts the same main runner (201) without a cross-T. FIG. 3 depicts a projection of the same main runner (201). As can be seen in the FIGS., the depicted main runner (201) is an elongated element in the nature of a beam. The length of the main runner (201) may vary from embodiment to embodiment, and is generally selected to span one of the two major axes of a fabricated structure.

The depicted hanger element (203) has a generally U-shaped cross-section, comprising two opposing hanger side elements (306) extending vertically from opposing ends of a hanger base element (307). The depicted hanger side elements (306) are generally parallel to one another, and generally perpendicular to the depicted hanger base element (307). The combination of the hanger side elements (306) and hanger base element (307) define a U-shaped cavity (304) accessible from a top side of the main runner (201). In the depicted embodiment, each of the top ends of the hanger side elements (306) include an inward projection (302) toward the midline of the main runner (201). The bottoms of these projections are shown having an angled element.

The hanger element (203) is generally sized and shaped to accept hardware connections and other equipment to facilitate overhead support of the main runner (201). Although such overhead support is not necessary in all installations, for particularly long main runners (201), or installations involving an unusually heavy load supported by the ceiling grid, it may be necessary or advisable to supplement the structural support of the main runner (201) by suspending the main runner (201) from the roof deck, or an overhead structural ceiling element or component thereof. This may be done, by way of example and not limitation, to the use of turnbuckles, tensioning rods, and other related hardware, which can attach to the main runner (201) via the hanger element (203). In such installations, the depicted main runner requires fewer supporting elements, reducing installation time and material cost.

As can be seen in the FIGS., extending downward from a midpoint of the hanger base element (307) is a main body element (204). In the depicted embodiment, the main body element (204) is generally in the configuration of a rectangular prism, and is connected to the hanger base element (307) at about a midpoint thereof, and is generally perpendicular thereto. The depicted main body element (204) extends from the depicted hanger base element (307) in a direction opposite that from which the hanger side elements (306) extend from the hanger base element (307). The depicted main body element (204) is generally dimensioned to provide adequate spacing between the ceiling of the fabricated structure and other elements (such as but not limited to the first cavity (205) and second cavity (207)) to provide sufficient clearance for equipment that may be installed within the ceiling.

The depicted main hanger further comprises an element adapted for attaching cross-Ts to the main runner. In the depicted embodiment, this element is a generally orthogonal S-shaped member comprising a top element (301), a middle element (303) and a bottom element (305) or base (305). The top element (301) is connected to the middle element (303) by a first side element (315) extending between the top element (301) and middle element (303) at a first lateral side of the main runner. In the depicted embodiment, these elements are connected generally orthogonally (i.e., at generally right angles). Likewise, the depicted middle element (303) is connected to the bottom element (305) or base (305) by a second side element (321).

In the depicted embodiment, disposed beneath the main body element (204) is a first cavity (205). The depicted first cavity (205) is a space defined by said top element (301), which is shown having a first attaching element (313), said middle element, which is shown having a second attaching element (318), and by said first side element (315) extending between the first (313) and second (318) attaching elements. In the depicted embodiment, the first attaching element (313) is two opposing pairs of similarly-configured attaching elements (313). The depicted first attaching elements (313) comprise receiving channels for a "screw boss", the receiving channels being defined by a top side (309) and an opposing bottom side (311) generally parallel to the top side (309). Each of the sides (309) and (311) has a set of ridges disposed on the inside surfaces and adapted to receive a threaded attaching element, such as a bolt, at any point along the channel. The depicted top side (309) is parallel to and opposite the hanger base element (307), and the main body element (204) extends perpendicularly therebetween.

Figure 7:
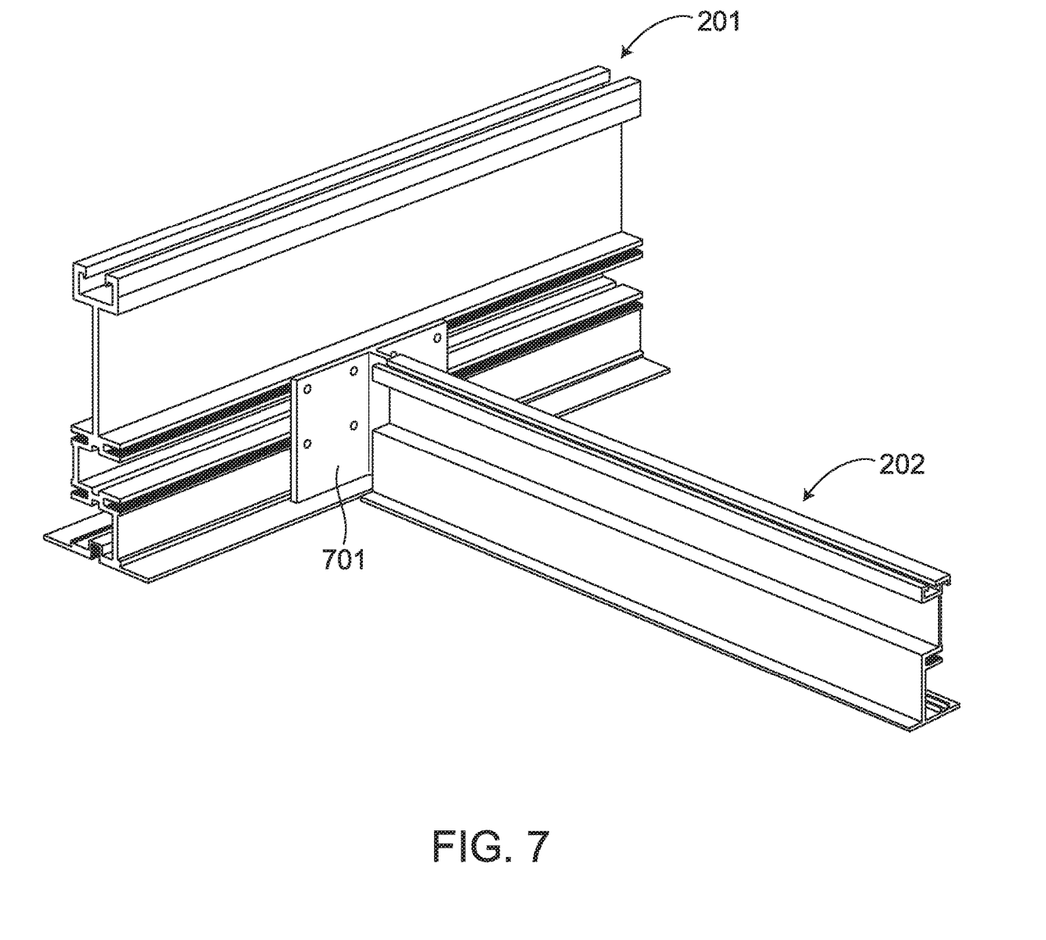
FIG. 7 is an orthogonal view of the main runner of FIG. 1 with an attached cross-T as described herein.

The depicted bottom element (307) and top side (309), in combination with the main body element (204), form an I-shape. The depicted receiving channels are accessible from a direction laterally outward from a midline of the main runner (201) and perpendicular to the main body element (204). Thus, a threaded attaching element may be attached to the main runner (201) by tightening it inward toward the midline of the main runner (201). As can be seen in FIG. 7, these attaching elements can be used to receive hardware that affixes a cross-T (202) to the main runner (201). In the depicted embodiment of FIG. 7, the cross-T (202) is connected to the main runner (201) via a connection clip (701), which is affixed using hardware.

The first side element (315) is shown as an elongated element generally in the configuration of a rectangular prism, attached at its top end to the bottom (311) of one of the two first attaching elements (313) and attached at its opposing end to the edge of a top side (317) of the second attaching element (318).

The depicted second attaching element (318) is in the same configuration as the first attaching element (313), and disposed parallel thereto. This facilitates the attachment of cross-Ts or other components by bolting to both the first (313) and second (318) attaching elements, providing amore stable mating. As seen in the depicted embodiment, a second side element (321) extends downward to the base (305) from the bottom (319) of the second attaching element (318). As seen, the second side element (321) extends from the opposite side of the second attaching element (318) from the side at which the first side element (315) attaches to the second attaching element (318). Thus, the bottom of the second attaching element (318), the base (305) and the second side element (321) form a generally C-shaped second cavity (207). The depicted based (305) is also generally in the configuration of an elongated rectangular prism.

In an embodiment, the open side of one or both of the cavities (205) and (207) may be fully or partially closed by one or more segments of additional walls for structural support. This type of section may provide additional structural strength if and as needed. By way of example and not limitation, in an embodiment, this section may be disposed opposite and parallel the respective first side element (315) or second side element (321).

In the depicted embodiment, the base element (307) of the hanger element (203), the side of the first attaching element (313), the sides of the second attaching element (318), and the base (305) are all generally parallel. By contrast, the main body element (204), the first side element (315), and the second side element (321) are also generally parallel, but not necessarily coplanar.

The base (305) is shown having a pair of opposing flanges (209) extending outwardly therefrom from opposing sides thereof. The depicted flanges (209) are thinner than the depicted base (305), forming a vertical lip at the inward edge of each flange (209) adjacent to the base (305). At the open end of the base (305), this lip is relatively small. On the closed end of the base (305), the lip is adjacent to the second side element (321). This configuration facilitates the attachment of cross-Ts to the main runner (201), the installation of other equipment, and the installation of acoustic ceiling panels.

Figure 4:
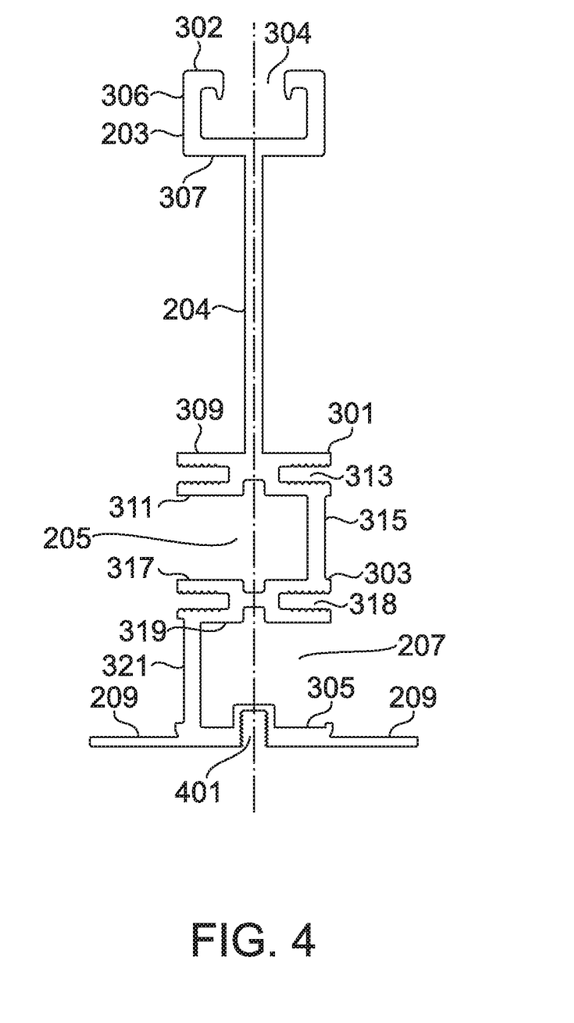
FIG. 4 is a cross-sectional view of an alternative embodiment of a main runner as described herein.
Figure 5:
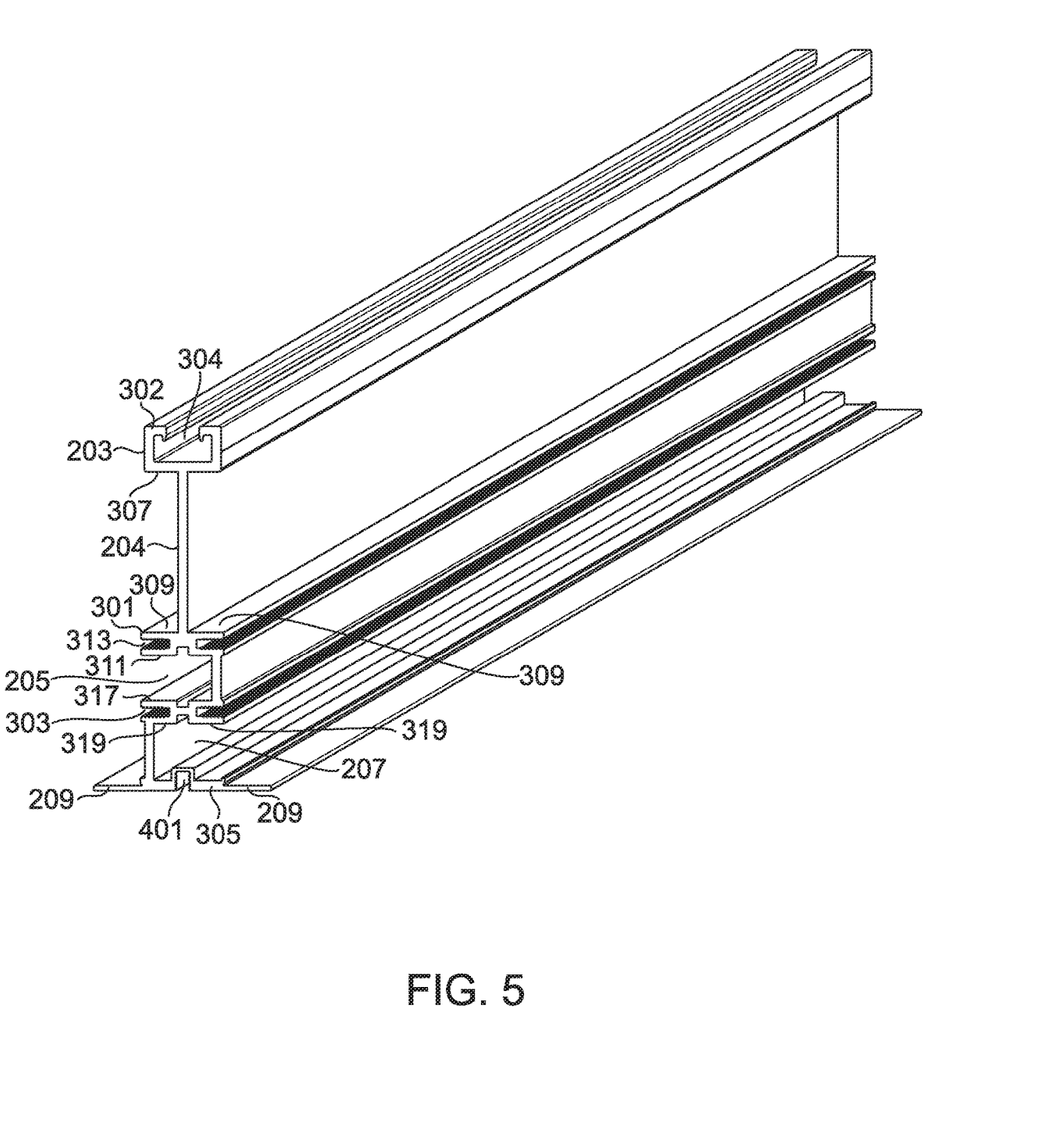
FIG. 5 is a protection of the main runner of FIG. 4.

In an embodiment, the base (305) may comprise a fastening, hanging, or mounting system (401) or element (401). FIG. 4 depicts one such embodiment FIG. 5 depicts a projection of the embodiment. In the depicted embodiment of FIG. 4, this element (401) is a screw boss having a threaded recess sized and shaped to receive a hanger or fastener, which may facilitate the installation or mounting of equipment. In the depicted embodiment, when the ceiling grid is assembled, the bottom surface of the main runner (201) is exposed to the interior useable space of the room beneath the acoustical ceiling. Thus, the depicted hanging element (401) is accessible, and may be used to hang equipment or other components within the useable interior of the room. By way of example, and not limitation, a network cable tray may be suspended from the ceiling using the mounting element (401), and used to run spans of network or engineering cables.

Figure 6:
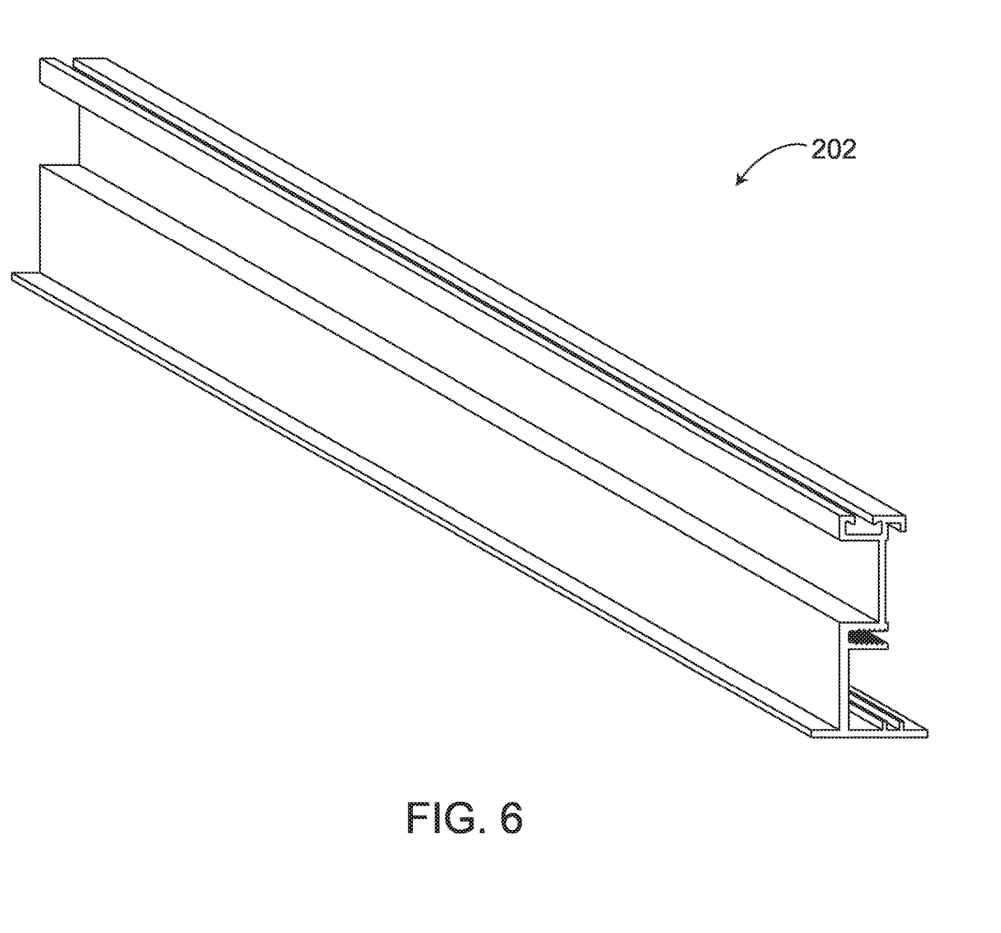
FIG. 6 is a projection view of a cross-T for use with a main runner as described herein.
Figure 8:
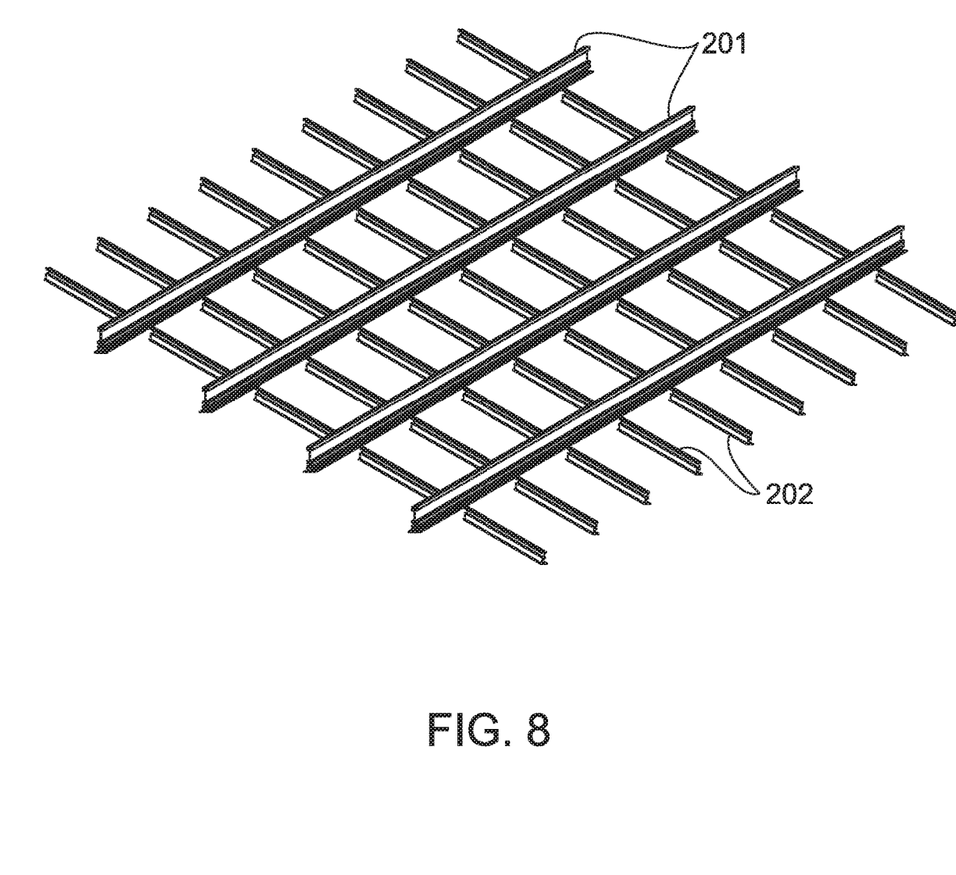
FIG. 8 is an exploded view of a ceiling grid comprised of main runners and cross-T's as described herein.

When in use, a plurality of main runners (201) are installed in parallel by mounting the opposing ends of each main runner (201) to wall molds installed on the interior of a fabricated. A set of cross-Ts (202) are then mounted to the plurality of main runners (201) to form an orthogonal grid, as shown in FIG. 8. The cross-Ts (202) may be mounted by any number of means. For example, an L- or T-bracket may be used to mount a cross-T (202) at either the first side element (315) or the second side element (321), depending on the side of the main runner (201) to which a given cross-T is attached. Alternatively, the cross-T (202) may have a flange or other attaching surface with an attaching aperture, which may be positioned to align with the attaching elements (313) and/or (318). Hardware, such as a threaded bolt, may be used to affix each cross-T (202) to the main runners (201). An embodiment of a cross-T (202) suitable for use as described herein is depicted in FIG. 6 main runner (201) with a cross-T (202) attached thereto is depicted in FIG. 7.

Equipment can also be attached to the main runner (201) using the attaching elements (313) and (318). For example, air conditioning, filtering, electronic equipment, and other devices and apparatus may be installed in the ceiling by attaching to the main runner (201) in the same general manner as cross-Ts.

The two cavities (205) and (207) also provide raceways for wiring and small electronics and electrical components. Each of the cavities (205) and (207) faces in an opposing direction, allowing wiring to be run to equipment installed to either side of the depicted main runner (201). Thus, the cavities (205) and (207) are generally sized and shaped to accommodate wiring and small electrical and electronic equipment, including, but not limited to, power lines, telecommunication wires, and receptacles.

The depicted main runner (201) has a number of advantages over the prior art. These include, but are not limited to, that the depicted main runner (201) maintains a rigid installation relationship with the roof deck. This design replaces a conventional structural roof deck, which has a wire hung ceiling grid. This provides many advantages, notably that seismic forces will be transferred via the main runner (201) to the structural studs. This reduces the degree to which seismic forces destabilize the structure. This inhibits ceiling failures, which can result in a loss of equipment, injuries or death and facilitate the installation of a walkable ceiling system, which facilitates cost-effective maintenance, repair, and cleaning, allows for overhead struts to be installed anywhere above the grid, and reduces installation time and cost. The grid structure facilitates load transfer capability between adjacent sections through mechanical continuity.

Additionally, the primary component runners and tees can be made from a corrosive-resistant and recyclable aluminum, which has sufficient strength to support lay-in panels, lighting, computer, network, and electrical equipment, filtration units, fans, while also providing a wide enough grid suspension system to allow for the installation of HVAC equipment and ducting. The grid structure described herein can accommodate varying sizes and configurations of filtering and lighting components, including but not necessarily limited to those commonly used in the industry. In an embodiment, stability can be further augmented by way of interior columns or other secondary support structures. Finally, in long-span installations which require additional support from an overhead structural roof, the number of tension rods required to adequately support the load is substantially reduced, reducing installation time, complexity, maintenance, and cost. The system is suitable for use in a wide assortment of settings, including but not limited to: office and meeting space; storage and records rooms; a computer or network closet or data room; a clean room; a medical examination, testing, diagnostic, laboratory, or treatment room; a quarantine or isolation room; or a botanical grow room.

Throughout this disclosure, geometric terms may be used to characterize, among other things, sizes, shapes, dimensions, angles, distances, and relationships. These terms may be used with qualifiers such as "generally," "about," and "approximately." One of ordinary skill in the art will understand that, in the context of this disclosure, these terms are used to describe a recognizable attempt to conform a device or component to the qualified term. By way of example and not limitation, components described as being "generally coplanar" will be recognized by one of ordinary skill in the art to not be actually coplanar in a strict geometric sense because a "plane" is a purely geometric construct that does not actually exist and no component is truly "planer," nor are two components ever truly coplanar. Variations from geometric descriptions are unavoidable due to, among other things, manufacturing tolerances resulting in shape variations, defects, imperfections, non-uniform thermal expansion, natural wear, minor variations that are nevertheless recognizable as the qualified term, and other deformations. One of ordinary skill in the art will thus understand how to apply geometric terms, whether or not qualified by relative terms such as "generally," "about," and "approximately," to describe a reasonable range of variations from the literal geometric term in view of these and other considerations appropriate to the context. Additionally, the use of the conjunctive and disjunctive should not necessarily be construed as limiting, and the conjunctive may include the disjunctive, and vice versa.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A main runner for use in a ceiling grid for a fabricated structure comprising:
   a first end and an opposing second end, with an elongated body extending therebetween, said elongated body having a cross-section comprising:
      a hanger element generally in the configuration of a U-shape and having an open top end adapted to accept hardware for suspending said main runner from an overhead structure;
      a main body element extending generally perpendicularly downward from a base of said hanger element; and
      a generally orthogonal S-shaped connecting element comprising:
         a top element, a middle element, and a bottom element;
         a first side element extending between said top element and said middle element at a first side to form a first cavity; and
         a second side element extending between said middle element and said bottom element at a second side opposite said first side to form a second cavity;
         wherein said top element, said middle element, and said bottom element are generally parallel;
         wherein said first side and said second side are generally parallel;
         wherein said top element, said middle element, and said bottom element are each generally perpendicular to each of said first side and said second side; and
         wherein said top element comprises a first pair of receiving channels disposed in opposing sides thereof.

2. The main runner of claim 1, wherein said first pair of receiving channels are threaded.

3. The main runner of claim 2, wherein said middle element comprises a second pair of receiving channels disposed in opposing sides thereof.

4. The main runner of claim 3, wherein said second pair of receiving channels are threaded.

5. The main runner of claim 1, wherein said bottom element comprises a pair of opposing flanges extending laterally therefrom.

6. The main runner of claim 5, wherein said pair of opposing flanges are sized and shaped to accept a ceiling panel on a top side thereof.

7. The main runner of claim 1, wherein said first cavity is sized and shaped to receive a plurality of cabling.

8. The main runner of claim 7, wherein said second cavity is sized and shaped to receive a second plurality of cabling.

9. The main runner of claim 1, wherein said bottom element comprises a bottom element receiver disposed in a bottom side thereof.

10. The main runner of claim 9, wherein said bottom element receiver is threaded.

11. A modular ceiling grid system comprising:
   a plurality of main runners, each main runner in said plurality of main runners having a first end and an opposing second end, with an elongated body extending therebetween, said elongated body having a cross-section comprising:
      a hanger element generally in the configuration of a U-shape and having an open top end adapted to accept hardware for suspending said plurality of main runners from an overhead structure;
      a main body element extending generally perpendicularly downward from a base of said hanger element;
      a generally orthogonal S-shaped connecting element comprising:
         a top element, a middle element, and a bottom element;
         a first side element extending between said top element and said middle element at a first side to form a first cavity; and a second side element extending between said middle element and said bottom element at a second side opposite said first side to form a second cavity;

wherein said top element, said middle element, and said bottom element are generally parallel;

wherein said first side and said second side are generally parallel;

wherein said top element, said middle element, and said bottom element are each generally perpendicular to each of said first side and said second side; and wherein said top element comprises a first pair of receiving channels disposed in opposing sides thereof; and a plurality of cross-Ts affixed to said plurality of main runners to form a generally orthogonal ceiling grid system.

12. The modular ceiling grid system of claim 11, wherein said plurality of main runners are connected at said first end and said second end to opposing walls of a prefabricated structure.

13. The modular ceiling grid system of claim 12, wherein said prefabricated structure is selected from the group consisting of: an in-plant office; a data center; a clean room; a medical examination, testing, diagnostic, laboratory, or treatment room; a quarantine or isolation room; and a botanical grow room.

14. The modular ceiling grid system of claim 11, wherein said plurality of main runners are suspended from an overhead structure by connecting said hanger elements to said overhead structure.

15. The modular ceiling grid system of claim 11, wherein said plurality of cross-Ts are affixed to said plurality of main runners by a bracket.

16. The modular ceiling grid system of claim 11, further comprising electrical, computer, or HVAC equipment installed on said modular ceiling grid system.

17. The modular ceiling grid system of claim 11, further comprising walkable decking installed on said modular ceiling grid system.

18. A method for installing a ceiling over a prefabricated or in-plant structure comprising:

providing a plurality of main runners, each main runner in said plurality having a first end and an opposing second end, with an elongated body extending therebetween, said elongated body having a cross-section comprising:
- a hanger element generally in the configuration of a U-shape and having an open top end adapted to accept hardware for suspending said plurality of main runners from an overhead structure;
- a main body element extending generally perpendicularly downward from a base of said hanger element;
- a generally orthogonal S-shaped connecting element comprising:
  - a top element, a middle element, and a bottom element;
  - a first side element extending between said top element and said middle element at a first side to form a first cavity; and
  - a second side element extending between said middle element and said bottom element at a second side opposite said first side to form a second cavity;
- wherein said top element, said middle element, and said bottom element are generally parallel;
- wherein said first side and said second side are generally parallel;
- wherein said top element, said middle element, and said bottom element are each generally perpendicular to each of said first side and said second side; and
- wherein said top element comprises a first pair of receiving channels disposed in opposing sides thereof;

providing a plurality of cross-Ts; and affixing said plurality of cross-Ts to said plurality of main runners to form a generally orthogonal ceiling grid system of a prefabricated structure.

19. The method of claim 18, wherein said prefabricated structure is selected from the group consisting of: an in-plant office; a data center; a clean room; a medical examination, testing, diagnostic, laboratory, or treatment room; a quarantine or isolation room; and a botanical grow room.

\* \* \* \* \*